United States Patent Office 3,057,902
Patented Oct. 9, 1962

3,057,902
ESTER SOLVENTS AND BASIC CATALYSTS EMPLOYED IN AN ADDITION PROCESS
Roscoe A. Pike, Grand Island, N.Y., assignor to Union Carbide Corporation, a corporation of New York
No Drawing. Filed Aug. 31, 1960, Ser. No. 53,029
20 Claims. (Cl. 260—448.2)

This invention relates to a process for producing organosilicon compounds. More particularly, this invention relates to a process for producing organosilicon adducts (i.e., addition products) from trichlorosilane and hydrocarbon or organosilicon compounds containing an aliphatic (i.e., non-benzenoid) carbon to carbon multiple bond.

Heretofore, organosilicon adducts have been produced by reacting trichlorosilane and hydrocarbon or organosilicon compounds containing an aliphatic carbon to carbon multiple bond (i.e., olefinic compounds or acetylenic compounds) in the absence of a catalyst. Such processes are unattractive since elevated temperatures of at least about 250° C. and usually from 300° C. to 400° C. are required to achieve satisfactory reaction rates. Moreover, even at such elevated temperatures, only low yields of the desired organosilicon adducts are produced in the absence of a catalyst. To avoid such elevated temperatures and to achieve satisfactory reaction rates and good yields at lower temperatures, it has been proposed to employ various compounds as catalysts for the reaction of trichlorosilane and hydrocarbon or organosilicon compounds containing an aliphatic carbon to carbon multiple bond. The various catalysts proposed to date (e.g. platinum and platinum compounds, peroxides, ultra-violet light and basic compounds including such tertiary amines as pyridine) have proven ineffective in catalyzing the desired reaction or suffer from other disadvantages. By way of illustration, platinum and platinum compounds, although they produce satisfactory yields of the organosilicon adducts at moderate temperatures, are expensive and can be rendered ineffective by catalyst poisons. As another illustration, peroxide catalysts are often unstable or volatile materials or catalyze undesirable side reactions. As a still further illustration, when basic compounds (e.g., pyridine) are used as catalysts, little or none of the desired organosilicon adducts are produced at moderate temperatures. As yet another illustration, when ultra-violet light is used as a catalyst, expensive reactors (e.g. quartz reaction vessels) are required to permit the catalyst to contact the reactants.

It is an object of the present invention to provide a process for producing improved yields of organosilicon adducts by reacting trichlorosilane and hydrocarbon or organosilicon compounds containing an aliphatic carbon to carbon multiple bond at moderate temperatures.

Another object of this invention is to provide a process for producing organosilicon adducts by reacting trichlorosilane and a hydrocarbon or organosilicon compound containing an aliphatic carbon to carbon multiple bond in conventional reactors employing relatively stable and nonvolatile catalysts that are also relatively inexpensive and uneffected by catalyst poisons.

This invention is based on the discovery that the use of a basic catalyst (i.e. a tertiary amine or a tertiary phosphine) in conjunction with a hydrocarbyl ester of an aliphatic carboxylic acid that is free of aliphatic carbon to carbon multiple bonds and that is a solvent for trichlorosilane and the catalyst makes possible the attainment of the above objects.

This invention provides a process for producing organosilicon adducts which involves (a) forming a reaction mixture containing: (1) trichlorosilane; (2) a hydrocarbon or organosilicon compound containing an aliphatic carbon to carbon multiple bond; (3) a catalytic amount of tertiary amine or phosphine that is free of aliphatic carbon to carbon multiple bonds; and (4) a hydrocarbyl ester of an aliphatic carboxylic acid that is free of aliphatic carbon to carbon multiple bonds and that is a solvent for trichlorosilane and the amine or phosphine and (b) maintaining the reaction mixture at a temperature at which the trichlorosilane and the hydrocarbon or organosilicon compound containing an aliphatic carbon to carbon multiple bond react to produce the adduct by the rupture of the hydrogen to silicon bond of the trichlorosilane and the addition of the hydrogen atom and the trichlorosilyl group so formed to the multiple bond. The process involves an addition reaction which can be represented, in the case of olefinic starting materials, by the skeletal equation:

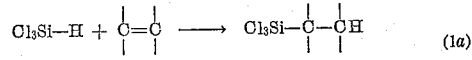

(1a)

and, in the case of acetylenic starting materials, by the skeletal equation:

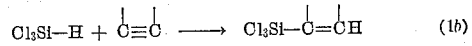

(1b)

The hydrocarbyl esters of aliphatic carboxylic acids that are free of aliphatic carbon to carbon multiple bonds which are suitable for use as solvents in the process of this invention include both the alkyl and the aryl esters of both monocarboxylic and polycarboxylic acids. Illustrative of these esters are such alkyl esters of monocarboxylic aliphatic acids as methyl, ethyl, propyl, butyl and pentyl acetate, propionate, butyrate, and pentanoate, and such aryl esters of monocarboxylic acids as phenyl and tolyl acetate, propionate, butyrate, and pentanoate. Also illustrative of these esters are such dialkyl esters of dicarboxylic aliphatic acids as dimethyl, diethyl, dibutyl and dipentyl oxalate, malonate, succinate and adipate and such diaryl esters of dicarboxylic aliphatic esters as diphenyl and ditolyl oxalate, malonate, succinate and adipate. Preferably, such esters are hydrocarbyl esters of monocarboxylic aliphatic acids and preferably such esters contain from 4 to 20, and more preferably from 4 to 10, carbon atoms inclusive. Suitable esters include both those that are liquids at room temperature and those that are solids at room temperatures but are liquids at those temperatures at which the process is conducted.

The catalysts employed in the process of this invention are soluble in hydrocarbyl esters of aliphatic carboxylic acids that are used as solvents. Trichlorosilane and many compounds containing an aliphatic carbon to carbon multiple bond are also soluble in these esters. Good results can be obtained, however, if compounds containing an aliphatic carbon to carbon multiple bond that are insoluble in these esters are employed.

These esters have a remarkable and unexpected effect on the catalysts employed in the process of this invention. That is, although little or none of the desired organosilicon adducts are obtained when such catalysts are employed in the absence of a solvent or in the presence of other solvents (e.g. benzene), good yields of the adducts are produced when these catalysts are employed dissolved in these esters.

The compounds containing an aliphatic carbon to carbon bond employed as starting materials in the process of this invention include both hydrocarbon and organosilicon olefinic compounds and acetylenic compounds.

Illustrative of the hydrocarbon olefinic compounds that are useful as reactants in the process of this invention are the alkenes (e.g. ethylene, propylene, butylene and 1-octylene), the aralkenes (e.g. styrene and vinyl toluene), the cycloalkenes (e.g. cyclopentene and cyclohexene) and vinyl cycloalkenes (e.g. vinyl cyclohexene). Illustrative of suitable hydrocarbon acetylenic compounds are the alkynes (e.g. acetylene, butyne-1, heptyne-1 and methyl acetylene) and the aralkynes (e.g. phenyl acetylene).

Illustrative of one type of organosilicon olefinic and acetylenic compounds that are useful as reactants in the process of this invention are the hydrocarbonhydrocarbonoxysilanes and the hydrocarbonhalosilanes that have the formula:

$$R'-\underset{\underset{X_{3-n}}{|}}{Si}R_n \qquad (2)$$

wherein R' is a monovalent hydrocarbon group containing an aliphatic carbon to carbon multiple bond (i.e. an olefinic or an acetylenic bond), R is a monovalent hydrocarbon group that is free of aliphatic carbon to carbon multiple bonds, X is a halogen atom or a hydrocarbonoxy group and $n$ has a value from 0 to 2 inclusive.

Typical of the groups represented by R in Formula 2 are linear alkyl groups (for example the methyl, ethyl, propyl, butyl and decyl groups), the cyclic alkyl groups (for example the cyclohexyl and cyclopentyl groups), the aryl groups (for example the phenyl and naphthyl groups), the alkaryl groups (for example the tolyl group) and the aralkyl groups (for example the benzyl and beta-phenylethyl groups).

Typical of the groups represented by R' in Formula 2 are the vinyl, allyl, CH≡C— and CH≡C—CH₂— groups.

Typical of the groups represented by X in Formula 3 are the halogen atoms, preferably chlorine or bromine, and the hydrocarbonoxy groups, such as the alkoxy groups (e.g. the ethoxy, methoxy and propoxy groups) and the aroxy groups (e.g. the phenoxy group).

Typical of the silanes of Formula 2 are vinyltrichlorosilane, vinylmethyldichlorosilane, vinyltriethoxysilan, allydiphenylethoxysilane, CH≡C—SiCl₃ and $$CH\equiv C-Si(CH_3)Cl_2$$

Illustrative of another type of organosilicon olefinic and acetylenic compounds that are useful as reactants in the process of this invention are hydrocarbonsiloxanes that contain a group represented by the formula:

$$R'SiO_{\frac{3-n}{2}}^{R_n} \qquad (3)$$

wherein R, R' and $n$ have the above-defined meanings. Typical of groups represented by Formula 3 are the CH₂=CHSiO₁.₅, CH₂=CHSi(CH₃)O $$CH_2=CHSi(CH_3)_2O_{0.5}$$

CH≡CHSiO₁.₅ and CH≡CSi(CH₃)O groups. Such siloxanes can be composed solely of groups represented by Formula 3 or the siloxanes can contain one or more groups represented by formula 3 and one or more groups represented by the formula:

$$R_mSiO_{\frac{4-m}{2}} \qquad (4)$$

wherein R has the above-defined meaning and $m$ has a value from 1 to 3 inclusive. Typical of the group represented by Formula 4 are the methylsiloxy, dimethylsiloxy, diphenylsiloxy, phenyldimethylsiloxy and trimethylsiloxy groups.

The hydrocarbon or organosilicon compounds containing an aliphatic carbon to carbon multiple bond employed in the process of this invention preferably contain only one aliphatic carbon to carbon multiple bond but compounds containing more than one aliphatic carbon to carbon multiple bond (e.g. butadiene, isoprene and vinyl acetylene) can be employed. Suitable reactants containing a carbon to carbon multiple bond are composed of carbon and hydrogen and, in the case of the organosilicon reactants, can also contain silicon and oxygen or halogen. The reactants are free of other atoms (e.g. such as nitrogen that is combined in a nitrile group). Preferably the compounds containing an aliphatic carbon to carbon multiple bond are hydrocarbons that contain from 2 to 20, and more preferably from 2 to 10, carbon atoms inclusive.

The tertiary amines and phosphines that are free of aliphatic carbon to carbon multiple bonds which are employed as catalysts in this invention include trialkyl amines and phosphines, triaryl amines and phosphines, mixed tertiary aryl-alkyl amines and phosphines, tertiary silyl amines and heterocyclic amines.

Illustrative of suitable trialkyl, triaryl and tertiary mixed aryl-alkyl amine and phosphine catalysts are those that are represented by the formula:

$$\underset{R}{\overset{R}{\diagdown}}E-R \qquad (5)$$

wherein R has the above-defined meaning and E is nitrogen or phosphorus. Typical of these catalysts are such amines as trimethyl amine, tripropyl amine, tributyl amine, triphenyl amine and ethyl diphenyl amine and such phosphines as trimethyl phosphine, tripropyl phosphine, tributyl phosphine, triphenyl phosphine and ethyl diphenyl phosphine.

Illustrative of suitable tertiary silyl amine catalysts are those represented by the formula:

$$\left[(RO)_{3-x}\overset{R}{\underset{|}{Si}}\right]_y NR_{3-y}$$

wherein R has the above-defined meaning, $x$ has a value from 0 to 3 inclusive, and $y$ has a value from 1 to 3 inclusive. Typical of these catalysts are $$[(C_2H_5O)_3Si]_2NC_6H_5$$

$$[(CH_3)_3Si]_2NC_3H_7, (C_2H_5)_2Si(C_6H_5)N(C_2H_5)_2 \text{ and}$$

$$[C_2H_5OSi(CH_3)_2]_3N$$

Illustrative of suitable heterocyclic amine catalysts are pyridine, the alkyl-substituted pyridines, quinoline, the alkyl-substituted quinolines, isoquinoline and the alkyl-substituted isoquinolines. Typical alkyl-substituted pyridines, quinolines and isoquinolines include alpha- and beta-picoline, alpha-ethyl pyridine, alpha-methyl quinoline and alpha-methyl isoquinoline. Such heterocyclic amines are composed only of carbon, hydrogen and nitrogen.

The preferred catalysts are those represented by Formula 5 wherein R is an alkyl group containing from 3 to 5 carbon atoms inclusive or a phenyl group.

The relative amounts of the reactants, catalyst and solvent employed in the process of this invention are not narrowly critical. Stoichiometric amounts of reactants are preferred in order to minimize the problem of separating unreacted reactants at the conclusion of the reaction but, if desired, an excess of either reactant can be employed. From 0.1 part to 5 parts by weight of the catalyst, or preferably from 1 part to 3 parts by weight of the catalyst, per 100 parts by weight of the trichlorosilane and the hydrocarbon or organosilicon compound containing an aliphatic carbon to carbon multiple bond are employed. From 0.1 mole to 5.0 moles of the solvent, or preferably from 0.3 mole to 1.0 mole of the solvent per mole of the trichlorosilane reacted are employed. Other than the indicated relative amounts of the reactants, catalysts and solvents can be employed but no commensurate advantage is obtained thereby.

The temperature employed in the process of this invention is not narrowly critical. Temperatures from 50° C. to 200° C. are useful but temperatures from 100° C. to 160° C. are preferred. Although other temperatures can be used, no commensurate advantage is gained thereby.

Disproportionation of the trichlorosilane used as a starting material can occur to some extent during the process of this invention. The disproportionation reaction produces a mixture of silicon products including silicon tetrachloride and dichlorosilane. The disproportionation reaction can be minimized by adding the trichlorosilane incrementally in relatively small amounts during the reaction to a large excess of the compound containing an aliphatic carbon to carbon multiple bond and/or by adding one of the products of the disproportionation reaction (e.g. silicon tetrachloride) to the initial reaction mixture.

When a hydrocarbon or organosilicon compound containing an aliphatic carbon to carbon multiple bond is employed in the process of this invention which readily homopolymerizes (e.g. styrene or butadiene), it is desirable, but not essential, to employ a polymerization inhibitor along with the trichlorosilane and the compound containing an aliphatic carbon to carbon multiple bond, catalyst and solvent. From 1 part to 4 parts by weight of a suitable conventional polymerization inhibitor (e.g. 2,6-di-tertiary-butyl-4-methyl phenol or tertiary-butyl catechol) per 100 parts by weight of the compounds containing an aliphatic carbon to carbon multiple bond can be successfully employed to suppress the homopolymerization of the compounds containing an aliphatic carbon to carbon multiple bond.

The process of this invention is conveniently conducted in a conventional pressure vessel or autoclave, particularly where volatile reactants, catalyst and/or solvents are employed. When such pressure vessels or autoclaves are employed, the process is conveniently conducted at the autogenous pressure generated in the vessel at the reaction temperature.

At the completion of the process of this invention, the desired organosilicon adduct can be separated from the reaction mixture by any suitable conventional means (e.g. extraction, filtration or fractional crystallization). Fractional distillation at atmospheric or reduced pressure is often a particularly satisfactory means for isolating the desired organosilicon adducts.

As is shown by Equations 1a and 1b, the type of organosilicon adduct produced by the process of this invention is dependent on the particular type aliphatic carbor to carbon multiple bonnd present in the reactant. Thus, when an olefinic compound is reacted with a trichlorosilane, the adduct so formed is free of olefinic unsaturation. On the other hand, when an acetylenic compound is reacted with a trichlorosilane, the adduct so formed is olefinically unsaturated. The latter adducts can be illustrated by Formula 2 where R' is a monovalent hydrocarbon group containing olefinic unsaturation and can be reacted further with the trichlorosilane to produce bis-(trichlorosilyl compounds) or they can be separated as such. In the latter case, short reaction times and/or excess of the acetylene compound is employed as a reactant.

The organosilicon adducts produced in accordance with the process of this invention can be hydrolyzed and condensed by conventional procedures to produce organosiloxane resins. Such resins can be utilized according to known techniques as protective coatings, molding resins and laminating resins.

The following examples illustrate the present invention:

*Example I*

Trichlorosilane (135 grams, 1.0 mole), ethyl acetate (60 grams) and triphenyl phosphine (7.0 grams) were placed in an 800 cubic centimeter steam-jacketed pressure vessel. The vessel was sealed and then purged three times with acetylene at 50 pounds per square inch pressure gage. The vessel was then charged with acetylene until the pressure therein reached 200 pounds per square inch gage. The vessel was heated with steam at 160° C. while rocked for two hours. A pressurre drop of 85 pounds per square inch was observed. The vessel was then cooled and 182 grams of liquid contents was withdrawn. The liquid was fractionally distilled at atmospheric pressure and there was so obtained vinyltrichlorosilane (17.2 grams).

The preceding example illustrates the improved yields obtained employing an ester solvent in accordance with the process of this invention. The following experiment illustrates the poor yields obtained when a hydrocarbon solvent is employed in producing adducts from $HSiCl_3$ and a compound containing a carbon to carbon multiple bond in the presence of a basic catalyst.

Styrene (52 grams, 0.5 mole), $HSiCl_3$ (67.8 grams, 0.5 mole), benzene (45 grams), 2,6-di-tertiary-butyl-4-methyl phenol (1 gram) and tributyl amine (2.4 grams) were placed in a 300 cubic centimeter stainless steel pressure vessel. The vessel was sealed and heated at 150° C. for two hours. The vessel was cooled and the liquid contents were withdrawn. The liquid contents were fractionally distilled and the following materials were isolated: a mixture of benzene and trichlorosilane (95 grams) which distilled as the temperature in the distilling flask rose to 85° C. at atmospheric pressure; styrene (4.5 grams) which distilled at 38° C. at 5 millimeters of mercury pressure; beta-phenylethyltrichlorosilane (3 grams) which distilled at 81–85° C. at 5 millimeters of mercury pressure; and a gel as a residue (probably polystyrene) which did not distill when the distilling flask was heated to 280° C.

*Example II*

When trichlorosilane (1 mole) and tripropyl amine (1 part by weight per 100 parts by weight of the reactants) that is dissolved in phenyl acetate (0.5 mole per mole of the trichlorosilane) are placed in an autoclave, and ethylene is charged to the autoclave under pressure to produce a reaction mixture and the reaction mixture so formed is heated at 125° C. for 1 hour, there is produced ethyltrichlorosilane, which can be isolated by fractional distillation. The ethyltrichlorosilane so produced can be identified by conventional and elemental and infra-red analysis.

*Example III*

When trichlorosilane (1.0 mole), vinyltrichlorosilane (1.0 mole), dimethyl malonate (0.5 mole) and $$[(CH_3)_3Si]_2NC_4H_9$$

(1 part by weight per 100 parts by weight of the reactants) are mixed together and heated at 160° C. for 1 hour in an autoclave, there is produced bis-(trichlorosilyl)ethane which can be isolated by fractional distillation and identified by conventional, elemental and infra-red analysis.

*Example IV*

When trichlorosilane, $HSiCl_3$ (1 mole), and the siloxane, $CH_2{=}CHSi(CH_3)_2OSi(CH_3)_3$ (1 mole), are heated together at 150° C. for 2 hours employing ethyl acetate (1 mole) as a solvent and tributyl amine (.02 mole) as a catalyst, there is produced the siloxane,

$Cl_3SiCH_2CH_2Si(CH_3)_2OSi(CH_3)_3$

*Example V*

When trichlorosilane (2 moles) and the siloxane, $H_2C{=}CHSi(CH_3)_2OSi(CH_3)_2CH{=}CH_2$ (1 mole), are heated together at 150° C. for 2 hours in a sealed autoclave employing propyl acetate (1 mole) as a solvent and triphenyl phosphine (.02 mole) as a catalyst, there is produced the siloxane,

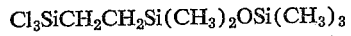
$Cl_3SiCH_2CH_2Si(CH_3)_2OSi(CH_3)_2CH_2CH_2SiCl_3$

*Example VI*

When $HSiCl_3$ (1 mole) and $CH_2{=}CHSi(OC_2H_5)_3$ (1 mole) are heated together at 150° C. for 2 hours in a sealed autoclave employing phenyl propionate (1 mole) as a solvent and tributyl amine (.01 mole) as a catalyst, there is produced $Cl_3SiCH_2CH_2Si(OC_2H_5)_3$. 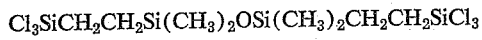

What is claimed is:

1. A process for producing organosilicon adducts which comprises (a) forming a reaction mixture containing (1) trichlorosilane; (2) an unsaturated compound selected from the group consisting of hydrocarbons, hydrocarbonhydrocarbonoxysilanes that are composed only of carbon, hydroben, oxygen and silicon, hydrocarbonhalosilanes that are composed only of carbon, hydrogen, halogen, and silicon and hydrocarbonsiloxanes that are composed only of carbon, hydrogen, oxygen and silicon, said unsaturated compound containing at least one aliphatic carbon to carbon multiple bond; (3) a catalytic amount of a catalyst selected from the group consisting of tertiary amines and tertiary phosphines, said catalyst being free of aliphatic carbon to carbon multiple bonds; and (4) a hydrocarbyl ester of an aliphatic carboxylic acid that is free of aliphatic carbon to carbon multiple bonds and that is a solvent for trichlorosilane and the catalyst and (b) maintaining the reaction mixture at a temperature at which the trichlorosilane and the unsaturated compound react to produce an adduct by the rupture of the hydrogen to silicon bond of the trichlorosilane and the addition of the hydrogen atom and the trichlorosilyl group so formed to a multiple bond of the unsaturated compound.

2. The process of claim 1 wherein the catalyst is a triaryl amine.

3. The process of claim 1 wherein the catalyst is a trialkyl phosphine.

4. The process of claim 1 wherein the catalyst is a heterocyclic amine composed only of carbon, hydrogen and nitrogen.

5. The process of claim 1 wherein the catalyst is a tertiary silyl amine.

6. The process of claim 1 wherein the catalyst is pyridine.

7. The process of claim 1 wherein the ester is a dialkyl ester of an aliphatic dicarboxylic acid.

8. The process of claim 1 wherein the ester is a diaryl ester of an aliphatic dicarboxylic acid.

9. The process of claim 1 wherein the ester is an aryl ester of a monocarboxylic aliphatic acid.

10. A process for producing organosilicon adducts which comprises (a) forming a reaction mixture containing (1) trichlorosilane; (2) a hydrocarbon olefinic compound containing only one olefinic bond and containing from 2 to 20 carbon atoms inclusive; (3) a catalytic amount of a trialkyl amine; and (4) an alkyl ester of a monocarboxylic aliphatic acid that is a solvent for trichlorosilane and the trialkyl amine and that contains from 4 to 20 carbon atoms inclusive (b) maintaining the reaction mixture at a temperature from 50° C. to 200° C. to cause the trichlorosilane and the olefinic compound to react to produce an adduct by the rupture of the hydrogen to silicon bond of the trichlorosilane and the addition of the hydrogen atom and the trichlorosilyl group so formed to the olefinic bond of the olefinic compound.

11. A process for producing organosilicon adducts which comprises (a) forming a reaction mixture containing (1) trichlorosilane; (2) a hydrocarbon acetylenic compound containing only one acetylenic bond and containing from 2 to 20 carbon atoms inclusive; (3) a catalytic amount of a trialkyl amine; and (4) an alkyl ester of a monocarboxylic aliphatic acid that is a solvent for trichlorosilane and the trialkyl amine and that contains from 4 to 20 carbon atoms inclusive and (b) maintaining the reaction mixture at a temperature from 50° C. to 200° C. to cause the trichlorosilane and the acetylenic compound to react to produce an adduct by the rupture of the hydrogensilicon bond of the trichlorosilane and the addition of the hydrogen atom and the trichlorosilyl group so formed to the acetylenic bond of the acetylenic compound.

12. A process for producing organosilicon adducts which comprises (a) forming a reaction mixture containing (1) trichlorosilane; (2) a silane that is represented by the formula:

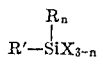

wherein R' is a monovalent hydrocarbon group containing an aliphatic carbon to carbon multiple bond, R is a monovalent hydrocarbon group free of aliphatic carbon to carbon multiple bonds, X is a member selected from the group consisting of the halogen atoms and the hydrocarbonoxy groups and n has a value from 0 to 2 inclusive; (3) a catalytic amount of a trialkyl amine; and (4) an alkyl ester of a monocarboxylic alipahtic acid that is a solvent for trichlorosilane and the trialkyl amine and that contains from 4 to 20 carbon atoms inclusive and (b) maintaining the reaction mixture at a temperature from 50° C. to 200° C. to cause the trichlorosilane and the silane to react to produce an adduct by the rupture of the hydrogen to silicon bond of the trichlorosilane and the addition of the hydrogen atom and the trichlorosilyl group so formed to an aliphatic carbon to carbon multiple bond of the silane.

13. A process for producing organosilicon adducts which comprises (a) forming a reaction mixture containing (1) trichlorosilane; (2) a siloxane consisting essentially of groups represented by the formula:

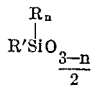

wherein R' is a monovalent group containing an aliphatic carbon to carbon multiple bond, R is a monovalent hydrocarbon group free of aliphatic carbon to carbon multiple bonds, and n has a value from 0 to 2 inclusive; (3) a catalytic amount of a trialkyl amine and (4) an alkyl ester of a monocarboxylic aliphatic acid that is a solvent for trichlorosilane and the trialkyl amine and that contains from 4 to 20 carbon atoms inclusive and (b) maintaining the reaction mixture at a temperature from 50° C. to 200° C. to cause the trichlorosilane and the siloxane to react to produce an adduct by the rupture of the hydrogen to silicon bond of the trichlorosilane and the addition of the hydrogen atom and the trichlorosilyl group so formed to an aliphatic carbon to carbon multiple bond of the siloxane.

14. A process for producing organosilicon adducts which comprises (a) forming a reaction mixture containing (1) trichlorosilane; (2) a siloxane consisting essentially of groups having the formulae:

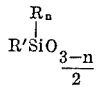

and

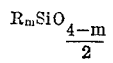

wherein R' is a monovalent hydrocarbon group containing an aliphatic carbon to carbon multiple bond, R is a monovalent hydrocarbon group free of aliphatic carbon to carbon multiple bonds, m has a value from 1 to 3 inclusive and n has a value from 0 to 2 inclusive; (3) a catalytic amount of a trialkyl amine; (4) an alkyl ester of a monocarboxylic aliphatic acid that is a solvent for trichlorosilane and the trialkyl amine and that contains from 4 to 20 carbon atoms inclusive and (b) maintaining the reaction mixture at a temperature from 50° C. to 200° C. to cause the trichlorosilane and the siloxane to react to produce an adduct by the rupture of the hydrogen to silicon bond of the trichlorosilane and the addition of the hydrogen atom and the trichlorosilyl group so formed to an aliphatic carbon to carbon multiple bond of the siloxane.

15. A process for producing an organosilicon adduct which comprises (a) forming a reaction mixture containing (1) trichlorosilane; (2) a hydrocarbon olefinic compound containing only one olefinic bond and containing from 2 to 20 carbon atoms inclusive; (3) a catalytic amount of a triaryl phosphine; and (4) an alkyl ester of a monocarboxylic aliphatic acid that is a solvent for trichlorosilane and the triaryl phosphine and that contains from 4 to 20 carbon atoms inclusive and (b) maintaining the reaction mixture at a temperature from 50° C. to 200° C. to cause the trichlorosilane and the olefinic compound to react to produce an adduct by the rupture of the hydrogen to silicon bond of the trichlorosilane and the addition of the hydrogen atom and the trichlorosilyl group so formed to the olefinic bond of the olefinic compound.

16. A process for producing organosilicon adducts which comprises (a) forming a reaction mixture containing (1) trichlorosilane; (2) a hydrocarbon acetylenic compound containing only one acetylenic bond and containing from 2 to 20 carbon atoms inclusive; (3) a catalytic amount of a triaryl phosphine; and (4) an alkyl ester of a monocarboxylic aliphatic acid that is a solvent for trichlorosilane and the triaryl phosphine and that contains from 4 to 20 carbon atoms inclusive and (b) maintaining the reaction mixture at a temperature from 50° C. to 200° C. to cause the trichlorosilane and the acetylenic compound to react to produce an adduct by the rupture of the hydrogensilicon bond of the trichlorosilane and the addition of the hydrogen atom and the trichlorosilyl group so formed to the acetylenic bond of the acetylenic compound.

17. A process for producing organosilicon adducts which comprises (a) forming a reaction mixture containing (1) trichlorosilane; (2) a silane that is represented by the formula:

wherein R' is a monovalent hydrocarbon group containing an aliphatic carbon to carbon multiple bond, R is a monovalent hydrocarbon group free of aliphatic carbon to carbon multiple bonds, X is a member selected from the group consisting of the halogen atoms and the hydrocarbonoxy groups and $n$ has a value from 0 to 2 inclusive; (3) a catalytic amount of a triaryl phosphine; and (4) an alkyl ester of a monocarboxylic aliphatic acid that is a solvent for trichlorosilane and the triaryl phosphine and that contains from 4 to 20 carbon atoms inclusive and (b) maintaining the reaction mixture at a temperature from 50° C to 200° C. to cause the trichlorosilane and the silane to react to produce an adduct by the rupture of the hydrogen to silicon bond of the trichlorosilane and the addition of the hydrogen atoms and the trichlorosilyl group so formed to an aliphatic carbon to carbon multiple bond of the silane.

18. A process for producing organosilicon adducts which comprises (a) forming a reaction mixture containing (1) trichlorosilane; (2) a siloxane consisting essentially of groups represented by the formula:

wherein R' is a monovalent group containing an aliphatic carbon to carbon multiple bond, R is a monovalent hydrocarbon group free of aliphatic carbon to carbon multiple bonds, and $n$ has a value from 0 to 2 inclusive; (3) a catalytic amount of a triaryl phosphine and (4) an alkyl ester of a monocarboxylic aliphatic acid that is a solvent for trichlorosilane and the triaryl phosphine and that contains from 4 to 20 carbon atoms inclusive and (b) maintaining the reaction mixture at a temperature from 50° C. to 200° C. to cause the trichlorosilane and the siloxane to react to produce an adduct by the rupture of the hydrogen to silicon bond of the trichlorosilane and the addition of the hydrogen atom and the trichlorosilyl group so formed to an aliphatic carbon to carbon multiple bond of the siloxane.

19. A process for producing an organosilicon adduct which comprises (a) forming a reaction mixture containing (1) trichlorosilane; (2) a siloxane consisting essentially of groups having the formulae:

and

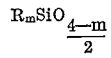

wherein R' is a monovalent hydrocarbon group containing an aliphatic carbon to carbon multiple bond, R is a monovalent hydrocarbon group free of aliphatic carbon to carbon multiple bonds, $m$ has a value from 1 to 3 inclusive, and $n$ has a value from 0 to 2 inclusive; (3) a catalytic amount of a triaryl phosphine; and (4) an alkyl ester of a monocarboxylic aliphatic acid that is a solvent for trichlorosilane and the triaryl phosphine and that contains from 4 to 20 carbon atoms inclusive and (b) maintaining the reaction mixture at a temperature from 50° C. to 200° C. to cause the trichlorosilane and the siloxane to react to produce an adduct by the rupture of the hydrogen to silicon bond of the trichlorosilane and the addition of the hydrogen atom and the trichlorosilyl group so formed to an aliphatic carbon to carbon multiple bond of the siloxane.

20. A process for producing vinyltrichlorosilane which comprises forming a reaction mixture containing trichlorosilane, acetylene, a catalytic amount of triphenylphosphine and ethyl acetate as a solvent for the trichlorosilane and triphenyl phosphine and heating the reaction mixture to a temperature from 100° C. to 160° C. to cause the trichlorosilane and the acetylene to react to produce vinyltrichlorosilane.

References Cited in the file of this patent
FOREIGN PATENTS 1,118,500    France _____ Mar. 19, 1956